US012645508B2

(12) United States Patent
Buban

(10) Patent No.: US 12,645,508 B2
(45) Date of Patent: Jun. 2, 2026

(54) HYBRID LOCKING/QUEUING OPERATIONS FOR MUTUAL EXCLUSION OF WORK UNITS

(71) Applicant: Microsoft Technology Licensing, LLC, Redmond, WA (US)

(72) Inventor: Garret Buban, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/797,952

(22) Filed: Aug. 8, 2024

(65) Prior Publication Data

US 2026/0044391 A1    Feb. 12, 2026

(51) Int. Cl.
G06F 9/52 (2006.01)
G06F 9/50 (2006.01)

(52) U.S. Cl.
CPC .............. G06F 9/52 (2013.01); G06F 9/5038 (2013.01)

(58) Field of Classification Search
None
See application file for complete search history.

(56) References Cited

U.S. PATENT DOCUMENTS

2022/0253339 A1 *  8/2022  Dice ................... G06F 9/30145

* cited by examiner

*Primary Examiner* — Scott C Sun

(57) ABSTRACT

According to examples, an apparatus includes processing units that execute threads using a hybrid locking/queuing operation for efficient processing of work units with mutual exclusion of the work units. Under the hybrid locking/queuing operation, a processing unit determines that a first thread is to process a first work unit, in which the first work unit is under protection of a hybrid exclusion object (HEO), and in which the HEO includes an HEO queue. In addition, the processing unit places a lock on the HEO, determines whether the HEO is owned by a thread, and based on a determination that the HEO is owned by a second thread, adds the first work unit to the HEO queue, and releases the lock on the HEO. The second thread assigns ownership of the HEO to the first work unit when the first work unit reaches a top of the HEO queue.

20 Claims, 7 Drawing Sheets

200

200
CONT.

A

USE
FIRST THREAD
TO PERFORM
FIRST WU?
210

NO → SELECT THREAD
TO OWN HEO
218

YES

ASSIGN HEO
OWNERSHIP TO FIRST
THREAD
212

ASSIGN HEO
OWNERSHIP TO
SELECTED THREAD
220

QUEUE FIRST WU TO
PRIVATE QUEUE OF
FIRST THREAD
214

QUEUE FIRST WU TO
PUBLIC QUEUE OF
SELECTED THREAD
222

RELEASE LOCK ON THE HEO
216

300
CONT.

A

IS HEO QUEUE EMPTY? 320

IS NEXT WU TARGET THREAD THIS THREAD? 322

MOVE NEXT WU FROM HEO QUEUE TO PRIVATE QUEUE OF THIS THREAD 324

NO

YES

YES

NO

RELEASE OWNERSHIP OF THE HEO 334

ASSIGN HEO OWNERSHIP TO TARGET THREAD 330

IS HEO QUEUE EMPTY? 326

NO

QUEUE NEXT WU TO TARGET THREAD'S PUBLIC QUEUE 332

YES

RELEASE THE LOCK ON THE HEO 328

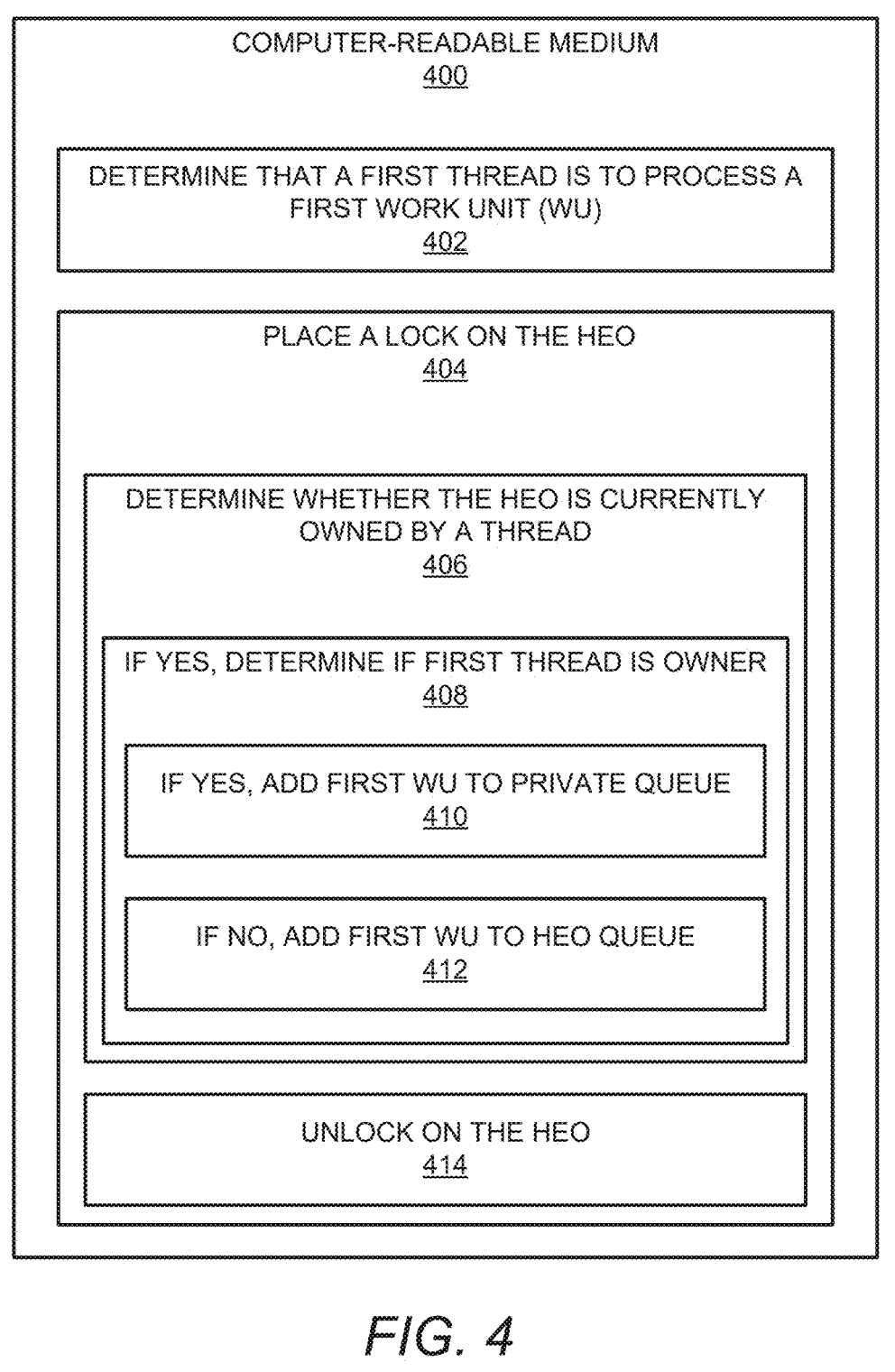

COMPUTER-READABLE MEDIUM
400

DETERMINE THAT A FIRST THREAD IS TO PROCESS A
FIRST WORK UNIT (WU)
402

PLACE A LOCK ON THE HEO
404

DETERMINE WHETHER THE HEO IS CURRENTLY
OWNED BY A THREAD
406

IF YES, DETERMINE IF FIRST THREAD IS OWNER
408

IF YES, ADD FIRST WU TO PRIVATE QUEUE
410

IF NO, ADD FIRST WU TO HEO QUEUE
412

UNLOCK ON THE HEO
414

*FIG. 4*

HYBRID LOCKING/QUEUING OPERATIONS FOR MUTUAL EXCLUSION OF WORK UNITS

BACKGROUND

Many types of computing systems employ systems that include multiple processing units. The multiple processing units allow multiple threads of execution to execute simultaneously to greatly increase the speeds at which computing tasks are processed. The processing units include multiple independent processing cores, each of which can share common computing resources, such as a memory, for executing the respective threads of execution on the computing resources.

BRIEF DESCRIPTION OF DRAWINGS

Features of the present disclosure are illustrated by way of examples shown in the following figures. In the following figures, like numerals indicate like elements, in which:

FIG. 4 shows a block diagram of a computer-readable medium that has stored thereon computer-readable instructions for using a hybrid locking/queuing operation for efficient work unit processing with mutual exclusion, in accordance with an embodiment of the present disclosure.

DETAILED DESCRIPTION

Figure 1A:
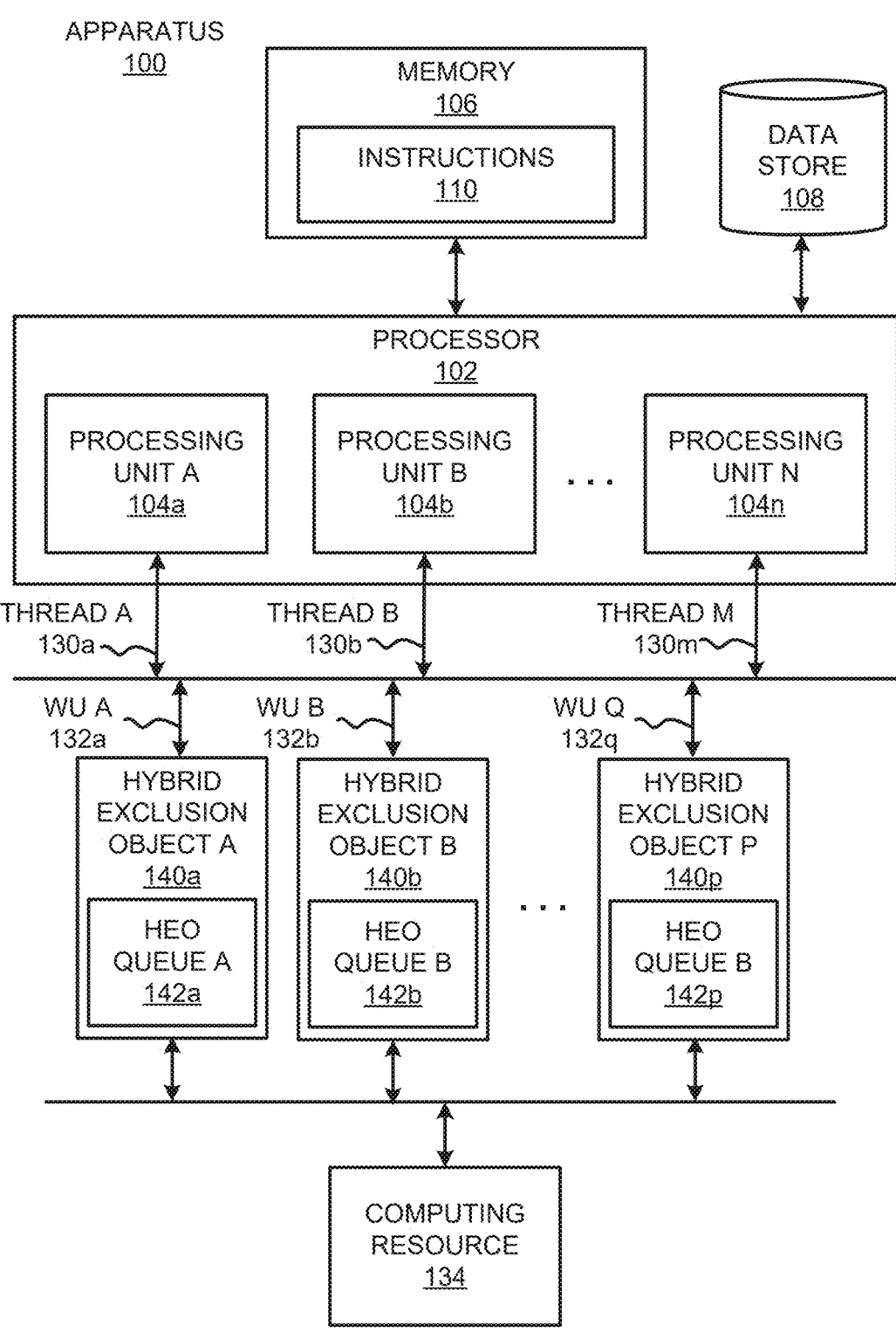
FIGS. 1A and 1B, respectively, show block diagrams of an apparatus including a processor having processing units that execute threads using a hybrid locking/queuing operation for efficient processing of work units with mutual exclusion of the work units, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well-known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to.

Computing systems that have multiple processing units to execute multiple threads often employ resource sharing schemes to increase the speeds at which computing tasks are processed. However, different threads can interfere with each other while accessing the shared resources, such as shared memory resources. For instance, conflicts arise when, for example, two threads attempt to access a same location in a memory or when a first thread attempts to write to a location in memory and a second thread attempts to read that same location in memory.

Mutual exclusion is often used in most modern computer systems to prevent conflicts with shared resources on these computer systems. Mutual exclusion in the context of access to shared resources is a concept used in concurrent programming to prevent multiple threads or processes from accessing a shared resource simultaneously. This ensures that when one thread or process is accessing a shared resource, no other thread or process can access that same shared resource until the first thread or process has finished with that shared resource. There are two techniques commonly used to achieve mutual exclusion of shared resource access. The first technique is to acquire some form of lock on the shared resource by a thread, which blocks other threads of execution from accessing the same resource at the same time. That is, a thread of execution acquires a lock on a resource that needs mutual exclusion before accessing the resource. If a second thread of execution already owns that lock, the access to the resource is blocked until the second thread is finished with access to that resource and releases the lock.

The lock technique is typically efficient on modern CPUs because the overall operation being processed can stay on one thread on one core. This is beneficial as the memory caches in CPUs are more likely to have hits, and context switching in operating systems tends to be expensive. However, the lock technique does not do well with high contention on the lock because, if there are a number of blocked threads of execution waiting on the lock, parallelism is decreased, and thus, overall efficiency of shared resource access is decreased.

The second technique is to queue shared resource accesses to a single thread of execution to ensure that the shared resource is accessed in series. Under this technique, a queue is assigned to a single thread of execution and units of work are put into the queue to be executed. The units of work are executed, for instance, in a first-in-first-out order. Since only one thread of execution is processing the work units, mutual exclusion of the work units is achieved. This technique scales very well with high contention, as threads can schedule work into the queue and then continue processing other, unrelated work. However, this technique is generally not very efficient if a given request involves a large number of queues. Scheduling overhead as a request moves from one thread of execution to another can also greatly decrease the efficiency of the system.

Disclosed herein are apparatuses having processing units that execute a hybrid locking/queuing operation on work units to enforce mutual exclusion on the work units. In other words, the processing units disclosed herein execute the hybrid locking/queuing operation to either lock a work unit or add the work unit to a queue depending on circumstances around processing of the work unit. For instance, the processing units lock the work unit for use by a particular thread when there is low or no contention on the work unit and queues the work unit when there is high contention on the work unit. The factors that indicate a low contention or a high contention situation may be user defined.

As disclosed herein, a hybrid exclusion object (HEO) is used to protect the work unit. The HEO includes a lock, a queue, and an owner field and may be assigned to the work unit. According to examples, when a first thread is to perform a work unit that is under the protection of the HEO, a processing unit places a lock on the HEO such that the processing unit is able to ascertain certain information about the HEO. For instance, the processing unit determines whether the HEO is currently owned by a thread, and if so, which thread. If the HEO is currently owned by a second thread other than a first thread that was assigned to process the work unit, the processing unit adds the work unit and an identifier of the first thread to an HEO queue. In addition, the second thread that currently owns the HEO, assigns ownership of the HEO to the first thread once the second thread is done processing the work unit and the first thread is at the top of the HEO queue. As the second thread hands off ownership of the HEO to the first thread, the second thread is no longer responsible for the HEO queue and is able to process other work units. Additionally, as the work unit for the first thread has been queued, the first thread is also able to process other work units while the first thread awaits its turn to process the work unit.

However, if the HEO is not owned by another thread or if the first thread already owns the HEO, in some examples, the processing unit locks the HEO and adds the work unit to a private queue of the first thread. The first thread is thus able to process the work unit when the work unit reaches a top of the private queue. In other examples, the processing unit selects a thread to process the work unit and adds the work unit to the public queue of the selected thread. The selected thread then processes the work unit when the work unit reaches a top of the private queue of that selected thread.

In some examples, when a thread completes a work unit for an HEO, the thread acquires a lock of the HEO and looks for more work units that have been queued to the HEO. If a next work unit has been queued to the HEO, e.g., is queued in the HEO queue, and the next work unit is for the current thread, the next work unit is moved from the HEO queue to the private queue of the current thread. However, if the next work unit is for another thread, ownership of the HEO is assigned to the other thread and the next work unit is moved from the HEO queue to the other thread's public queue. If there are no work units in the HEO queue, ownership of the HEO is cleared and the HEO lock is released. This process is repeated for additional work units in the HEO queue.

Through implementation of the features of the present disclosure, an HEO is able to dynamically change behaviors based on the contention level in the computing system. For instance, the HEO behaves like a lock when it is more efficient to do so and behaves like a queue when it is more efficient to so. As a result, for instance, threads that are waiting to process certain work units are free to process other work units while the work units under contention are queued in the HEO queue. Additionally, a thread that currently owns an HEO assigns ownership of the HEO to another thread that is to process a work unit that is next in line in the HEO queue. As a result, the thread that currently owns the HEO does not need to continually monitor and update the HEO queue, which frees up that thread to process other work units. A technical improvement afforded through implementation of the features of the present disclosure is that the work units are processed more quickly and efficiently, which reduces the time that threads are sitting idle. This results in decreased energy and computing resource usage in processing the work units.

Figure 1B:
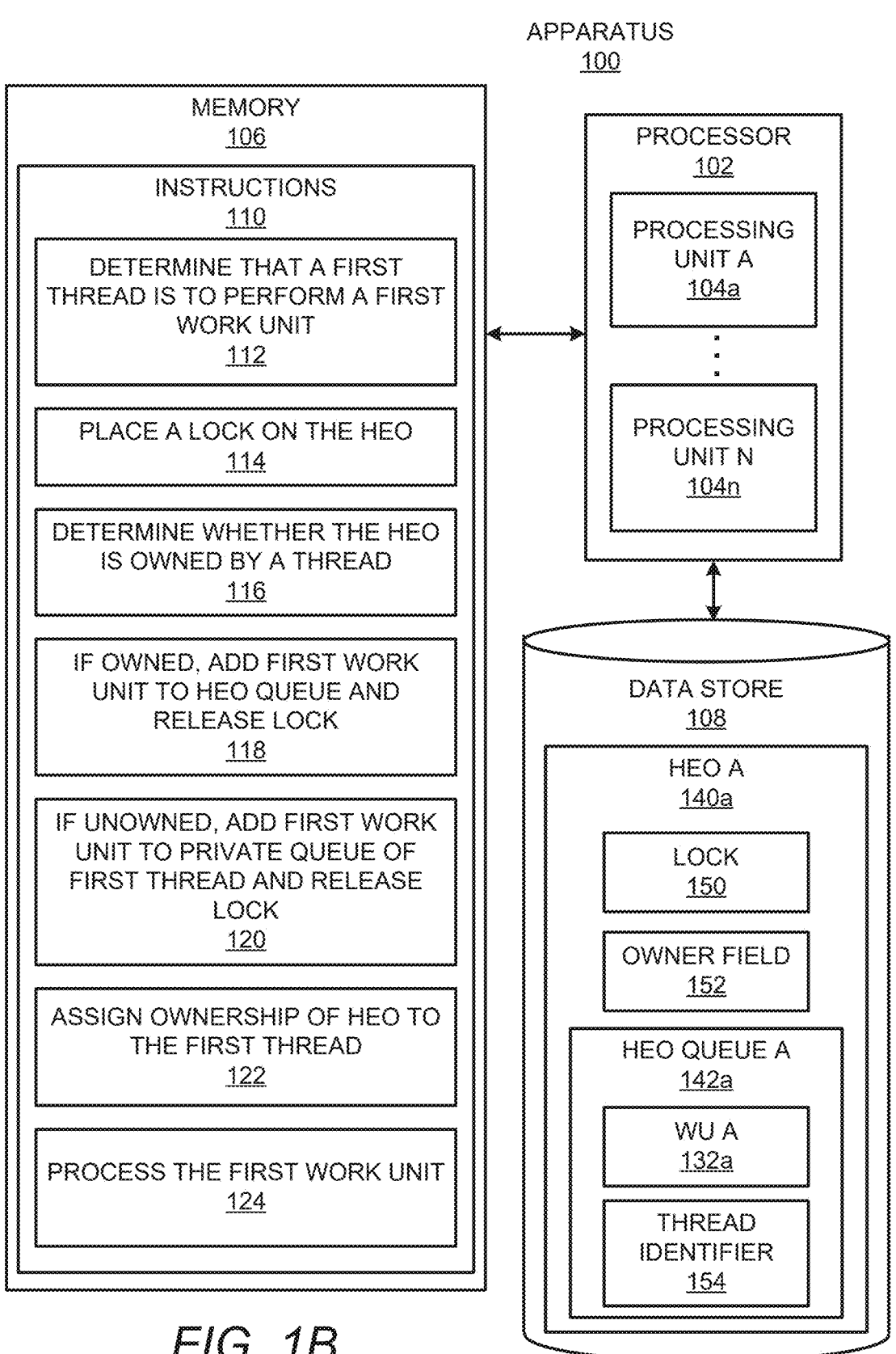

Reference is first made to FIGS. 1A and 1B, which respectively show block diagrams of an apparatus 100 including a processor 102 having processing units 104a-104n that execute threads using a hybrid locking/queuing operation for efficient processing of work units with mutual exclusion of the work units, in accordance with an embodiment of the present disclosure. It should be understood that the apparatus 100 shown in FIGS. 1A and 1B may include additional elements and that some of the elements described herein may be removed and/or modified without departing from the scope of the present disclosure.

As shown in FIGS. 1A and 1B, the apparatus 100 includes a processor 102, which includes multiple processing units 104a-104n, in which the variable "n" represents a value greater than 1. The apparatus 100 also includes a memory 106 and a data store 108. According to examples, the apparatus 100 is a computing device, such as a server, a laptop computer, a desktop computer, or the like. In addition, the processor 102 is a central processing unit (CPU) of the apparatus 100 that includes the processing units 104a-104n. The processing units 104a-104n may equivalently be termed cores 104a-104n of the processor 102.

As discussed in greater detail herein, the memory 106 has stored thereon machine-readable instructions 110, e.g., software, that the processing units 104a-104n execute to execute threads (which may also be referenced as "threads of execution") using a hybrid locking/queuing operation for efficient mutual exclusion processing of work units. The machine-readable instructions 110 stored in the memory 106 are shown in greater detail in FIG. 1B. Generally speaking, and as discussed herein, the processing units 104a-104n execute the instructions 110 to implement locks for work units of the threads in low contention situations and implement queues for work units of the threads in high contention situations. By employing the hybrid locking/queuing techniques disclosed herein, the benefits of both locking and queuing are achieved while also increasing efficiency as the threads are able to perform other tasks or work units while the threads are awaiting their turns in processing the work units. In other words, when there is no or a low contention, a thread obtains an exclusive lock on a work unit and when there is high contention, the work unit is added to a queue.

As shown in FIG. 1A, the processing units 104a-104n can have or handle threads 130a-130m, which may be defined as software-based instructions that the processing units 104a-104n can process. The variable "m" represents a value greater than one. In other words, each of the threads 130a-130m may be defined as an independent sequence of instructions that a processing unit 104a-104n can schedule and execute. The threads 130a-130m may equivalently be termed execution units, threads of execution, and/or the like. In some examples, some or all of the processing units 104a-104n can handle multiple threads 130a-130m simultaneously to further increase the number of tasks that may be handled simultaneously.

As discussed herein, the processing units 104a-104n execute the threads 130a-130m to process work units 132a-132q, in which the variable "q" represents a value greater than one. The work units (WUs in FIG. 1A) 132a-132q may be any type of task that the threads 130a-130m may process. Examples of work units include performance of calculations, data access and manipulation, handling of client requests, downloading of files, various I/O operations, and/or the like. According to examples, the processor 102 assigns (e.g., schedules) the processing units 104a-104n to handle the threads 130a-130n that process the work units 132a-132q. In addition, the processing units 104a-104n execute the threads 130a-130m to process the work units 132a-132q.

In some instances, there is contention among some of the threads 130a-130m in processing the work units 132a-132q. That is, some of the work units 132a-132q may seek to access and/or modify the same data stored in a computing resource 134, e.g., a memory on which is stored a file, a table, a set of instructions, or other information, concurrently. If this occurs and the data is modified during processing of a first work unit 132a, processing of a second work unit 132b on the data may result in errors. For instance, there may be conflicting changes and thus, the data may be corrupt. Similar issues may arise if two threads 130a, 130b attempt to process the same work unit 132a at the same time.

In order to prevent such issues, mutual exclusion of the work units 132a-132q is employed as discussed herein. Particularly, the work units 132a-132q are mutually excluded by protecting the work units under hybrid exclusion objects (HEOs) 140a-140p, in which the variable "p" represents a value greater than one. An HEO 140a may be defined as a type of object that includes a lock 150, an HEO queue 142a, and an owner field 152, that is assigned to a work unit 132a-132q. In some examples, all of the work units 132a-132q are under the protection of a respective HEO 140a-140p.

With reference to FIGS. 1A and 1B, the instructions 110 include a set of instructions 112-124 that the processing units 104a-104n execute. Although the following discussion is directed to a particular processing unit 104a, it should be understood that the discussion is applicable to the remaining processing units 104b-104n. According to examples, a processing unit 104a executes the instructions 112 to determine that a first thread 130a is to process a first work unit 132a. The processing unit 104a may make this determination when the processor 102 assigns the first work unit 132a to the first thread 130a, e.g., places the first work unit 132a into a queue of the first thread 130a.

The processing unit 104a executes the instructions 114 to place a lock 150 on the HEO 140a (assigned to the first work unit 132a). The lock 150 on the HEO 140a protects the data structure of the HEO 140a by, for instance, ensuring mutual exclusion of the HEO 140a while the first thread 130a has the lock 150 on the HEO 140a. That is, the lock 150 on the HEO 140a prevents another thread 130b-130m from accessing the HEO 140a while the lock 150 is in place. While the lock on the HEO 140a is in place, the first thread 130a determines whether the HEO 140a is owned by a thread, which thread owns the HEO 140a, whether the HEO queue 142a includes any threads, etc.

The processing unit 104a executes the instructions 116 to determine whether the HEO 140a is already owned by a thread. In some examples, the processing unit 104a determines that the HEO 140a is already owned by a thread if the HEO 140a includes an indication in the owner field 152 that the HEO 140a is already owned by a thread. If owned by a thread, the indication also includes an identification of the thread that owns the HEO 140a.

In some instances, the processing unit 104a determines that another thread, e.g., a second thread 130b, currently owns the HEO 140a. In these instances, the processing unit 104a executes the instructions 118 to add the first work unit 132a to the HEO queue 142a and to release the lock 150 on the HEO 140a. The processing unit 104a also adds an identifier 154 of the first thread 130a that is to process the first work unit 132a to the HEO queue 142a such that the first thread 130a may be identified once the first work unit 132a is to be processed.

As discussed herein, adding the first work unit 132a to the HEO queue 142a includes adding an identifier 154 or some indicator of the first work unit 132a to the HEO queue 142a. Accordingly, it should be understood that references made herein to the first work unit 132a (or another work unit) being added to a queue means that an identifier or some indicator of the first work unit 132a (or another work unit)

is being added to the queue. Likewise, references made herein to the first work unit 132a (or another work unit) being removed from a queue means that an identifier or some indicator of the first work unit 132a (or another work unit) is being removed from the queue.

The HEO queue 142a is, in some examples, a first-in-first-out queue such that the first work unit 132a is added to an end or tail of the HEO queue 142a. In addition, the first work unit 132a moves up the HEO queue 142a as work units ahead of it are processed. Particularly, for instance, a second thread 130b that currently owns the HEO 140a completes processing of a second work unit 132b and the second thread 130b releases ownership of the HEO 140a. The second thread 130b also assigns ownership of the HEO 140a to the thread that is to process the work unit that is next in line in the HEO queue 142a. In some examples, the second thread 130b assigns ownership of the HEO 140a to the next thread by adding ownership of the HEO 140a to the thread to a public queue. The public queue is a queue that, for instance, each of the threads 130a-130m is able to access. By assigning ownership of the HEO 140a to the next thread, the second thread 130b is no longer responsible for the HEO 140a. As result, the second thread 130b does not need to monitor the HEO queue 142a and may thus process other work units.

In an instance in which the first work unit 132a reaches the top of the HEO queue 142a, the second thread 130b assigns ownership of the HEO 140a to the first thread 130a. In some examples, the second thread 130b assigns ownership of the HEO 140a to the first thread 130a by adding ownership of the HEO 140a to the first thread 130a to a public queue of the first thread 130a. Various operations that the first thread 130a implements to process the first work unit 132a are described in greater detail herein with respect to FIGS. 3A and 3B.

Following addition of the first work unit 132a to the HEO queue 142a, the first thread 130a is free to process other work units while the first work unit 132a is in the HEO queue 142a. As a result, the first thread 130a may not remain idle while the first thread 130a waits to obtain ownership of the HEO 140a and process the first work unit 132a and the first thread 130a may process work units more quickly and therefore more efficiently. In addition, by releasing the lock on the HEO 140a, another thread 130b is able to obtain the lock 150 and perform similar operations.

However, based on a determination that the HEO 140a is not owned by a thread, the processing unit 104a executes the instructions 120 to add the first work unit 132a to a private queue of the first thread 130a and to release the lock on the HEO 140a. In addition, the processing unit 104a executes the instructions 122 to assign ownership of the HEO 140a to the first thread 130a. Moreover, the processing unit 104a executes the instructions 124 to execute the first thread 130a to process the first work unit 132a while the first thread 130a has ownership of the HEO 140a and the first work unit 132a is at a top of the private queue of the first thread 130a. Following processing of the first work unit 132a, the first thread 130a relinquishes ownership of the HEO 140a.

As discussed herein, the first work unit 132a is assigned ownership of the HEO 140a in instances in which the HEO 140a is not currently owned by another thread or when the first work unit 132a reaches a top of the HEO queue 142a and the current owner of the HEO 140a assigns the HEO 140a to the first thread 130a. In either of these instances, once the first work unit 132a is assigned ownership of the HEO 140a, the processing unit 104a moves the first work unit 132a from a public queue of the first thread 130a to a private queue of the first thread 130a. In addition, when the first work unit 132a reaches a top of the private queue of the first thread 130a, the processing unit 104a removes the first work unit 132a from the private queue and processes the first work unit 132a.

According to examples, following processing of the first work unit 132a by the first thread 130a, the processing unit 104a places a lock 150 on the HEO 140a. In addition, while the lock 150 is on the HEO 140a, the processing unit 104a determines whether the HEO queue 142a is empty. Based on a determination that the HEO queue 142a is empty, the processing unit 104a releases ownership of the HEO 140a. However, based on a determination that the HEO queue 142a is not empty, the processing unit 104a determines whether a next work unit 132b in the HEO queue 142a is for the first thread 130a or for another thread 130b. Based on the next work unit 132b being for the first thread 130a, the processing unit 104a moves the next work unit 132b from the HEO queue 142a to the private queue of the first thread 130a. Alternatively, based on a determination that the next work unit 132b is for the other thread 130b, the processing unit 104a assigns ownership of the HEO 140a to the other thread 130b and the next work unit 132b is moved from the HEO queue 142a to the public queue of the other thread 130b. In addition, the processing unit 104a releases the lock 150 on the HEO 140a.

With respect to FIGS. 1A and 1B, the memory 106, which may also be termed a computer-readable medium and is, for example, a Random Access memory (RAM), an Electrically Erasable Programmable Read-Only Memory (EEPROM), a storage device, or the like. In some examples, the memory 106, is a non-transitory computer-readable storage medium, where the term "non-transitory" does not encompass transitory propagating signals. In any regard, the memory 106, has stored thereon machine-readable instructions executable respectively by processor 102. Similarly, the data store 108 may also be a Random Access memory (RAM), an Electrically Erasable Programmable Read-Only Memory (EE-PROM), a storage device, or the like.

Although the apparatus 100 is depicted as having a single processor, it should be understood that the apparatus 100 may include additional processors and/or cores without departing from the scope of apparatus 100. In this regard, references to a single processor 102, as well as to a single memory 106, may be understood to additionally or alternatively pertain to multiple processors 102 and/or multiple memories 106. In addition, or alternatively, the processor 102 and the memory 106 may be integrated into a single component, e.g., an integrated circuit on which both the processor 102 and the memory 106 may be provided. In addition, or alternatively, the operations described herein as being performed by the processor 102 can be distributed across multiple corresponding apparatuses 100 and/or multiple processors 102.

Figure 2A:
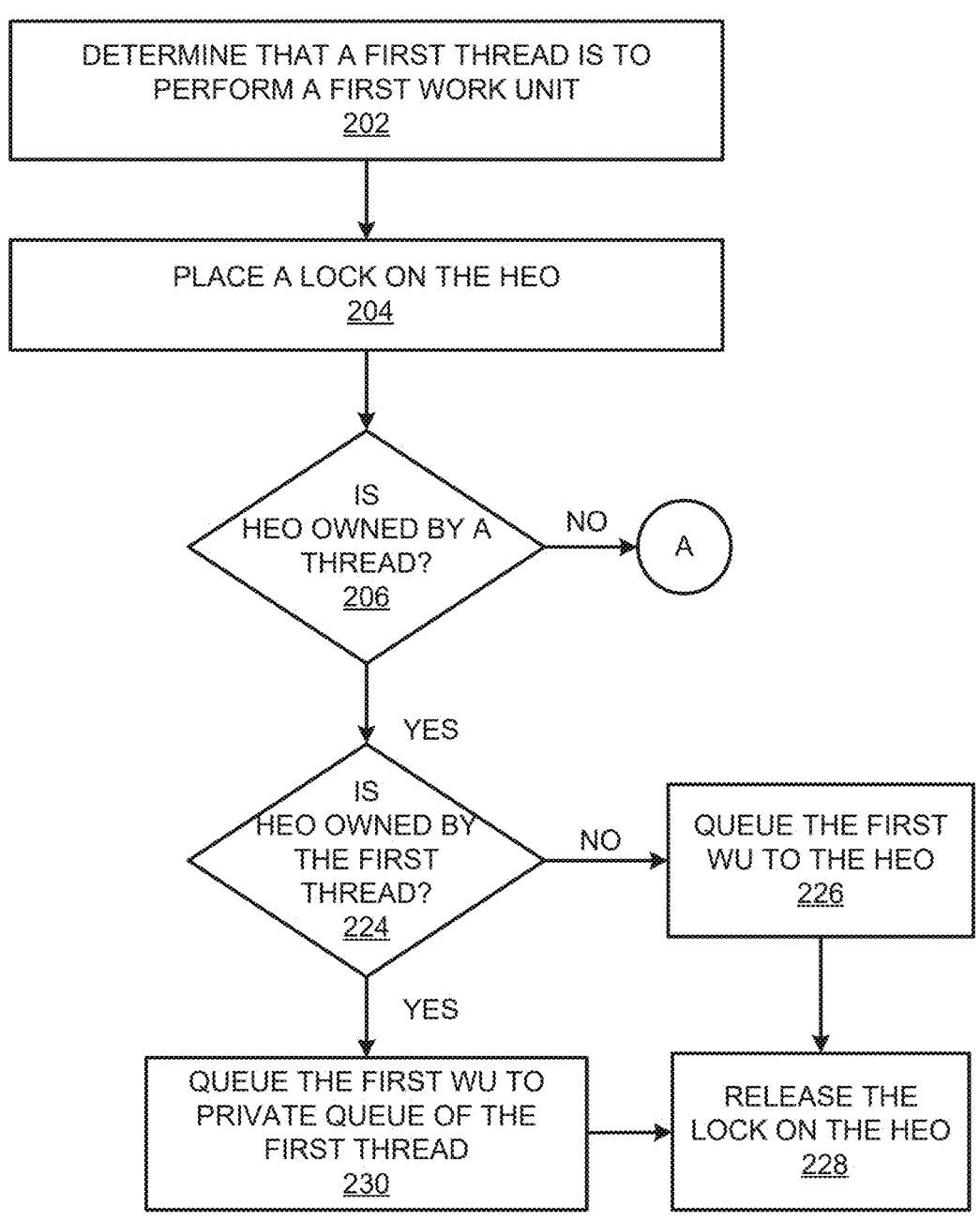
FIGS. 2A and 2B, collectively, depict a flow diagram of a method for using a hybrid locking/queuing operation for efficient work unit processing with mutual exclusion of the work unit, in accordance with an embodiment of the present disclosure.
Figure 2B:
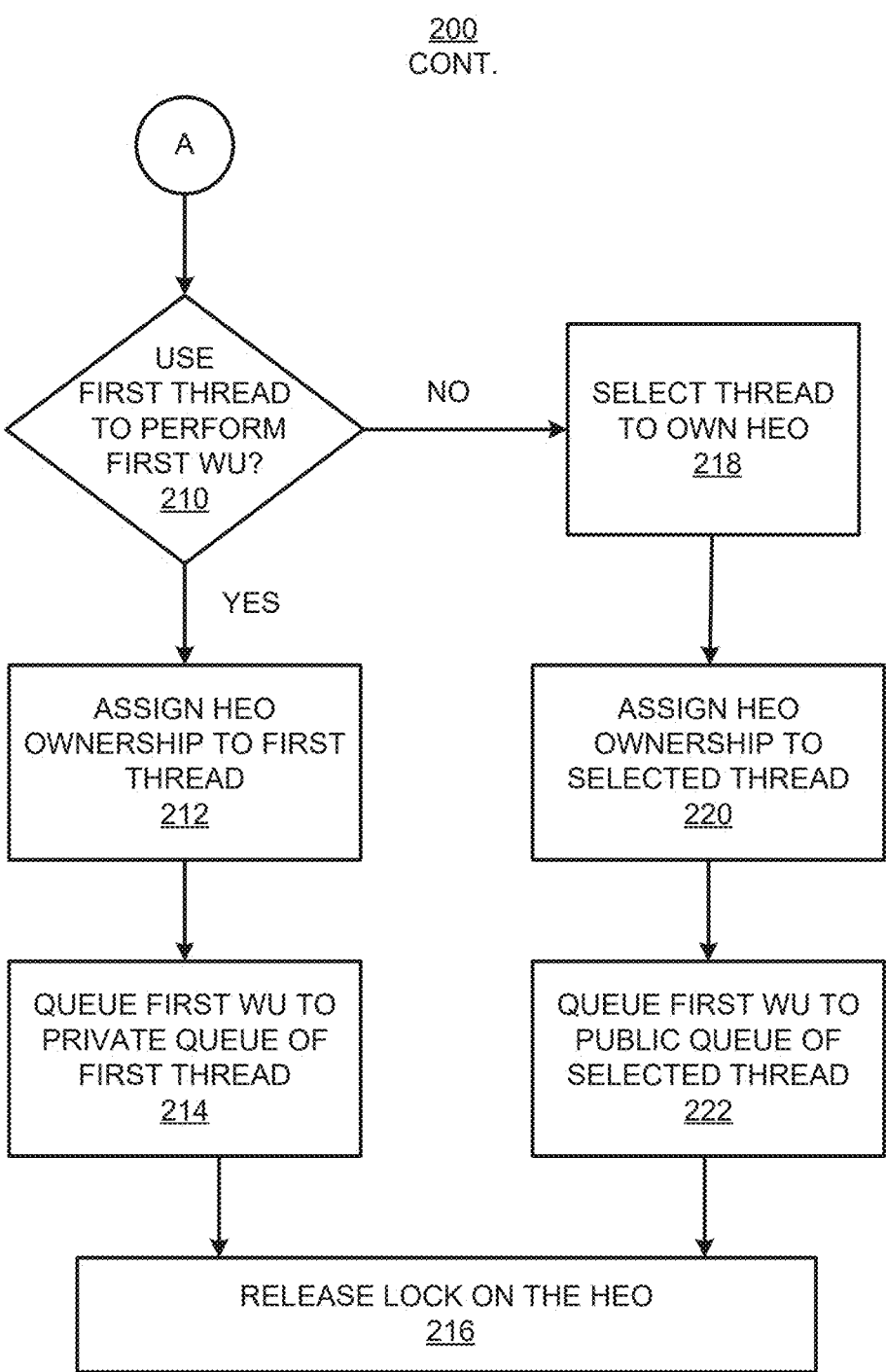
Figure 3A:
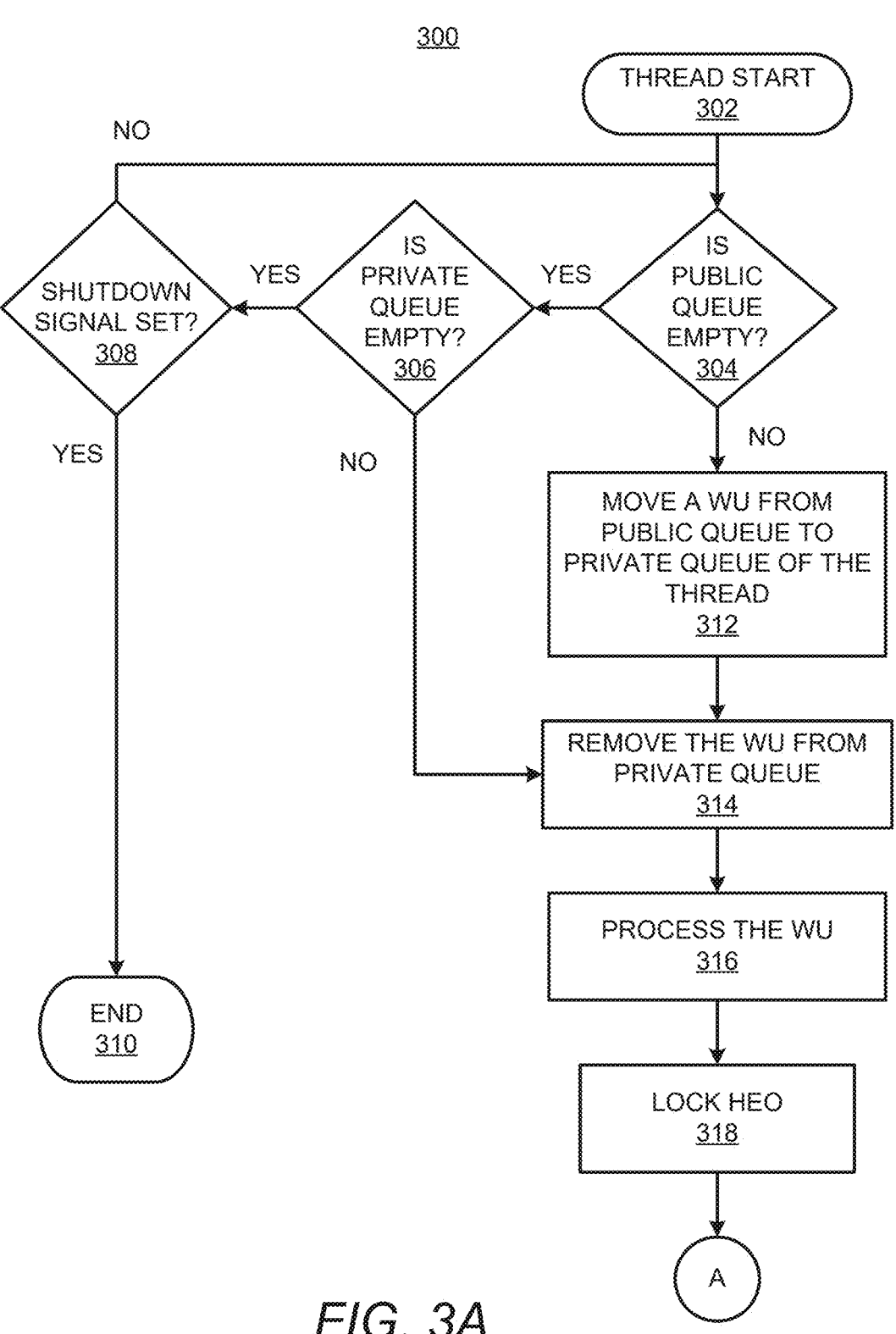
FIGS. 3A and 3B, collectively, depict a flow diagram of a method for executing threads to process work units, in accordance with an embodiment of the present disclosure.
Figure 3B:
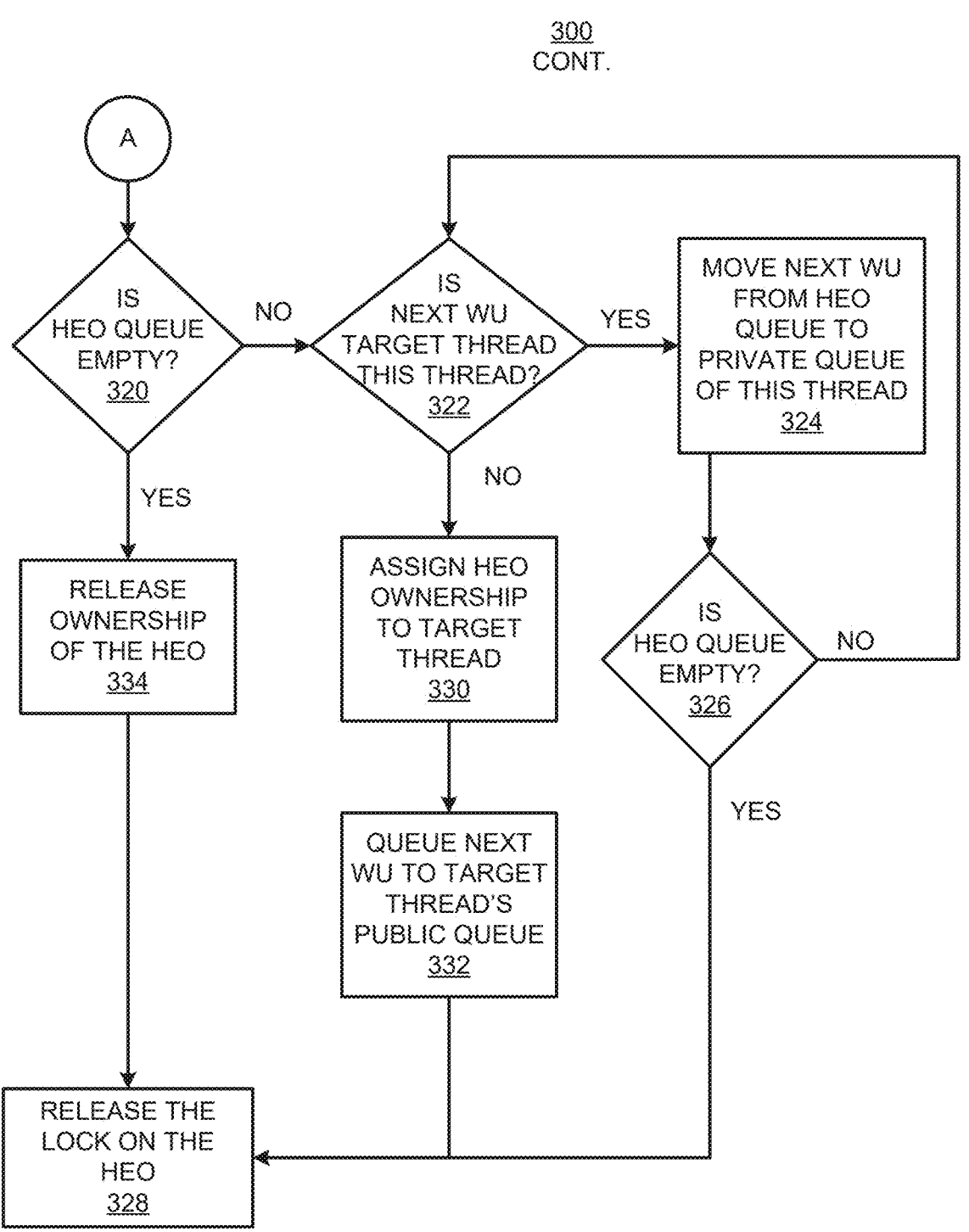

Various manners in which the processing units 104a-104n of the apparatus 100 operate are discussed in greater detail with respect to the method 200 depicted in FIGS. 2A and 2B and the method 300 depicted in FIGS. 3A and 3B. FIGS. 2A and 2B, collectively, depict a flow diagram of a method 200 for using a hybrid locking/queuing operation for efficient work unit processing with mutual exclusion of the work units, in accordance with an embodiment of the present disclosure. It should be understood that the method 200 may include additional operations and that some of the operations described therein may be removed and/or modified without departing from the scope of the method 200. The description of the method 200 is made with reference to the features depicted in FIGS. 1A and 1B for purposes of illustration.

At block 202, the processing unit 104a determines that a first thread 130a is to process a first work unit (WU) 132a. In addition, at block 204, the processing unit 104a places a lock 150 on the HEO 140a. As discussed herein, the lock on the HEO 140a protects the data structure of the HEO 140a.

At block 206, while the processing unit 104a has the lock on the HEO 140a, the processing unit 104a determines if the HEO 140a is owned by a thread, which thread owns the HEO 140a, whether the HEO queue 142a includes any threads, etc.

Based on a determination that a thread does not own the HEO 140a, the processing unit 104a determines whether the first thread 130a is to process the first work unit 132a at block 210 (FIG. 2B). The processing unit 104a makes this determination based on, for instance, whether there is a better thread to own the HEO 140a and process the first work unit 132a than the first thread 130a. Another thread may be better suited to own the HEO 140a and process the first work unit 132a, for instance, when that thread has cached some data related to the first work unit 132a, when processing of the first work unit 132a by another thread will be more efficient, when that thread has fewer work units in its queue than the first thread 130a, and/or the like.

Based on a determination that the first thread 130a is to process the first work unit 132a, at block 212, the processing unit 104a assigns ownership of the HEO 140a to the first thread 130a. For instance, the processing unit 104a may include an identification of the first thread 130a in the owner field 152 of the HEO 140a. In addition, at block 214, the processing unit 104a queues the first work unit 132a to the private queue of the first thread 130a. At block 216, the processing unit 104a releases the lock 150 on the HEO 140a.

However, based on a determination that the first thread 130a is not to process the first work unit 132a at block 210, for instance, based on a determination that another thread is to process the first work unit 132a, at block 218, the processing unit 104a selects a thread other than the first thread 130a to own the HEO 140a and process the first work unit 132a. The processing unit 104a may select the thread 130b that is best suited or better suited than the first thread 130a at the time to process the first work unit 132a. In addition, at block 220, the processing unit 104a assigns ownership of the HEO 140a to the selected thread 130b and at block 222, queues the first work unit 132a to the public queue of the selected thread 130b. The processing unit 104a also releases the lock 150 on the HEO 140a at block 216.

With reference back to FIG. 2A, at block 206, based on a determination that the HEO 140a is owned by a thread, the processing unit 104a determines whether the first thread 130a owns the HEO 140a at block 224. Based on a determination that the first thread 130a does not own the HEO 140a, at block 226, the processing unit 104a queues the first work unit 132a to the HEO queue 142a. In other words, based on a determination that a second thread 130b owns the HEO 140a, the processing unit 104a queues the first work unit 132a to the HEO queue 142a along with an identifier 154 of the first thread 130a. In addition, at block 228, the processing unit 104a releases the lock 150 on the HEO 140a.

However, based on a determination that the first thread 130a owns the HEO 140a, at block 230, the processing unit 104a queues the first work unit 132a to the private queue of the first thread 130a. In addition, at block 228, the processing unit 104a releases the lock on the HEO 140a.

FIGS. 3A and 3B, collectively, depict a flow diagram of a method 300 for executing threads 130a-130m to process work units 132*a*-132*q*, in accordance with an embodiment of the present disclosure. It should be understood that the method 300 may include additional operations and that some of the operations described therein may be removed and/or modified without departing from the scope of the method 300. The description of the method 300 is made with reference to the features depicted in FIGS. 1A and 1B for purposes of illustration.

At block 302, the processing unit 104*a* starts a thread, e.g., the first thread 130*a* or a selected thread 130*b* (from block 218 in FIG. 2B), to process the work unit 132*a*. Although particular reference is made with respect to FIGS. 3A and 3B to the first thread 130*a* processing the work unit 132*a*, it should be understood that the description of FIGS. 3A and 3B may instead be directed to the selected thread 130*b* without departing from a scope of the present disclosure. The processing unit 104*a* may start the thread 130*a* at block 302 following the work unit 132*a* being queued to a public queue of the thread. The processing unit 104*a* may also start the thread 130*a* at block 302 following assignment of ownership of the HEO 140*a* to the thread 130*a*, for instance, by a thread 130*b* that previously owned the HEO 140*a* as discussed herein.

At block 304, the processing unit 104*a* determines whether the public queue of the thread 130*a* is empty. Based on a determination that the private queue of the thread 130*a* is empty, at block 306, the processing unit 104*a* determines whether the private queue of the thread 130*a* is empty. Based on a determination that the private queue of the thread 130*a* is empty, at block 308, the processing unit 104*a* determines whether a shutdown signal has been set. Based on a determination that the shutdown signal has been set, the method 300 ends at block 310.

However, based on a determination that the shutdown signal has not been set at block 308, the processing unit 104*a* again determines whether the public queue of the thread 130*a* is empty at block 304. The processing unit 104*a* executes blocks 304-308 until a determination is made at block 304 that the shutdown signal has been set at block 308, that the public queue of the thread 130*a* is not empty at block 304, or that the private queue of the thread 130*a* is not empty at block 306. Based on a determination at block 304 that the public queue of the thread 130*a* is not empty, at block 312, the processing unit 104*a* moves a work unit 132*a* from the public queue to the private queue of the thread 130*a*. In addition, at block 314, the processing unit 104*a* removes the work unit 132*a* from the private queue of the thread 130*a*. The processing unit 104*a* also removes the work unit 132*a* from the private queue of the thread 130*a* based on a determination that the private queue of the thread 130*a* is not empty at block 306. In addition, at block 316, the processing unit 104*a* executes the thread 130*a* to process the work unit 132*a*. At block 318, the processing unit 104*a* locks the HEO 140*a*.

At block 320 (FIG. 3B), the processing unit 104*a* determines whether the HEO queue 142*a* is empty. Based on a determination that the HEO queue 142*a* is not empty, at block 322, the processing unit 104*a* determines whether the target of a next work unit 132*b* in the HEO queue 142*a* is the current thread 130*a*. Based on a determination that the target of the next work unit 132*b* is the current thread 130*a*, at block 324, the processing unit 104*a* moves the next work unit 132*b* from the HEO queue 142*a* to the private queue of the current thread 130*a*. In addition, at block 326, the processing unit 104*a* determines whether the HEO queue 142*a* is empty. Based on a determination that the HEO queue 142*a* is not empty, the processing unit 104*a* executes block

322 to determine whether the current thread 130*a* is the target of a next work unit 132*c* in the HEO queue. In addition, the processing unit 104*a* executes blocks 322-326 until a determination is made that the HEO queue 142*a* is empty at block 326 or that the current thread 130*a* is not the target of a next work unit 132*b* at block 322. Based on a determination that the HEO queue 142*a* is empty at block 326, the processing unit 104*a* releases the lock on the HEO 140*a* at block 328.

Alternatively, with reference back to block 322, based on a determination that the target of the next work unit 142*b* is not the current thread 130*a*, at block 330, the processing unit 104*a* assigns ownership of the HEO 140*a* to the target thread 130*b*. In addition, at block 332, the processing unit 104*a* queues the next work unit 142*b* to the target thread's 130*b* public queue. The processing unit 104*a* also releases the lock on the HEO 140*a* at block 328.

With reference back to block 320, based on a determination that the HEO queue 142*a* is empty, the processing unit 104*a* releases ownership of the HEO 140*a* at block 334. In addition, the processing unit 104*a* releases the lock on the HEO 140*a* at block 328.

In some examples, some or all of the operations set forth in the methods 200 and 300 are included as utilities, programs, or subprograms, in any desired computer accessible medium. In some examples, the methods 200 and 300 are embodied by computer programs, which may exist in a variety of forms both active and inactive. For example, the computer programs exist as machine-readable instructions, including source code, object code, executable code or other formats. Any of the above, in some examples, are embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 4, there is shown a block diagram of a computer-readable medium 400 that has stored thereon computer-readable instructions for using a hybrid locking/queuing operation for efficient work unit processing with mutual exclusion, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. In some examples, the computer-readable medium 400 is a non-transitory computer-readable medium, in which the term "non-transitory" does not encompass transitory propagating signals.

As shown in FIG. 4, the computer-readable medium 400 has stored thereon computer-readable instructions 402-418 that a processing unit, such as a processing unit 104*a* of the apparatus 100 depicted in FIGS. 1A and 1B executes. The computer-readable medium 400 is an electronic, magnetic, optical, or other physical storage device that contains or stores executable instructions. The computer-readable medium 400 is, for example, Random Access memory (RAM), an Electrically Erasable Programmable Read-Only Memory (EEPROM), a storage device, an optical disc, and the like.

The processing unit 104*a* executes the instructions 402 to determine that a first thread 130*a* is to process a first work unit 132*a*. The processing unit 104*a* executes the instructions 404 to place a lock on the HEO 140*a*. The processing unit 104a also executes the instructions 406 to determine whether the HEO 140a is currently owned by a thread. Based on a determination that the HEO 140a is currently owned by a thread, the processing unit 104a executes the instructions 408 to determine whether the first thread 130a is the current owner of the HEO 140a. Based on a determination that the first thread 130a is the current owner of the HEO 140a, the processing unit 104a executes the instructions 410 to add the first work unit 132a to a private queue of the first thread 130a. Or, based on a determination that the first thread 130a is not the current owner of the HEO 140a, the processing unit 104a executes the instructions 412 to add the first work unit 132a to the HEO queue 142a.

Following the addition of the first work unit 132a to the private queue of the first thread 130a or the HEO queue 142a, the processing unit executes the instructions 414 to unlock the HEO 140.

However, based on a determination that the HEO 140a is not currently owned by a thread, the processing unit 104a determines whether the first thread is to process the first work unit 132a. If so, the processing unit assigns ownership of the HEO 140a to the first thread 130a and adds the first work unit to a private queue of the first thread 130a. However, if the processing unit 104a determines that the first thread is not to process the first work unit 132a, the processing unit 104a selects another thread to process the first work unit 132a, assigns the HEO to the selected another thread, and adds the first work unit to a public queue of the selected another thread. The processing unit 104a also unlocks the HEO 140a following the addition of the first work unit 132a to the private queue of the first thread or the selected another thread.

In an example in which the HEO 140a is currently owned by a thread other than the first thread 130a (for instance, a second thread 130b), in addition to the first work unit 132a, the processing unit 104a adds an identifier of the first thread 130a to the HEO queue 142a. In addition, the second thread 130b completes processing of another work unit that is under protection of the HEO 140a, releases ownership of the HEO 140a when completed, and assigns ownership of the HEO 140a to the first thread 130a.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor including processing units; and
a memory on which is stored machine-readable instructions that when executed by a processing unit of the processing units, cause the processing unit to:
determine that a first thread is to process a first work unit, wherein the first work unit is under protection of a hybrid exclusion object (HEO), the HEO including an HEO queue;
place a lock on the HEO;

determine whether the HEO is owned by a thread; and
based on a determination that the HEO is owned by a second thread,
add the first work unit to the HEO queue; and
release the lock on the HEO.

2. The apparatus of claim 1, wherein the instructions cause the processing unit to:
based on a determination that the HEO is owned by a thread and not owned by the second thread,
determine whether the first thread owns the HEO;
based on a determination that the first thread owns the HEO,
add the first work unit to a private queue of the first thread; and
release the lock on the HEO; or
based on a determination that the first thread does not own the HEO,
add the first work unit to the HEO queue; and
release the lock on the HEO.

3. The apparatus of claim 1, wherein the instructions cause the processing unit to:
based on a determination that the HEO is not owned by a thread, determine whether the first thread is to own the HEO;
based on a determination that the first thread is to own the HEO,
assign ownership of the HEO to the first thread;
add the first work unit to a private queue of the first thread; and
release the lock on the HEO; or
based on a determination that the first thread is not to own the HEO,
select another thread to own the HEO;
assign ownership of the HEO to the selected another thread;
add the first work unit to a public queue of the selected another thread; and
release the lock on the HEO.

4. The apparatus of claim 1, wherein the instructions cause the processing unit to:
determine whether the first work unit is to be scheduled under the protection of the HEO; and
place the lock on the HEO based on the determination that the first work unit is to be scheduled under the protection of the HEO.

5. The apparatus of claim 1, wherein the instructions cause the processing unit to:
based on the determination that the HEO is owned by the second thread, process another work unit while the first work unit is in the HEO queue.

6. The apparatus of claim 1, wherein the instructions cause the processing unit to:
based on the determination that the HEO is owned by the second thread, add an identifier of the first thread in the HEO queue, wherein the second thread is to:
complete processing of a second work unit that is under the protection of the HEO;
release ownership of the HEO; and
assign ownership of the HEO to the first thread using the identifier of the first thread.

7. The apparatus of claim 6, wherein to assign ownership of the HEO to the first thread, the instructions cause the processing unit to:
add ownership of the HEO to the first thread to a public queue.

8. The apparatus of claim 1, wherein the instructions cause the processing unit to:

while the lock on the HEO is in place,
  determine that the HEO is owned by the first thread;
  add the first work unit to a private queue of the first
    thread; and
  release the lock on the HEO.

9. The apparatus of claim 1, wherein the instructions
cause the processing unit to:
  assign ownership of the HEO to first thread following the
    first work unit reaching a top of the HEO queue;
  move the first work unit from a public queue to a private
    queue of the first thread;
  remove the first work unit from the private queue of the
    first thread;
  process the first work unit; and
  place a lock on the HEO.

10. The apparatus of claim 9, wherein the instructions
cause the processing unit to:
  while the lock is on the HEO,
    determine whether the HEO queue is empty;
    based on a determination that the HEO queue is empty,
      release ownership of the HEO; or
    based on a determination that the HEO queue is not
      empty, move another work unit in the HEO queue to
      the private queue of the first thread; and
  release the lock on the HEO.

11. A method comprising:
  determining, by a processing unit, whether a first work
    unit that is to be scheduled under protection of a hybrid
    exclusion object (HEO) is to be performed, the HEO
    including an HEO queue;
  based on a determination that the first work unit is to be
    scheduled under protection of the HEO,
    placing, by the processing unit, a lock on the HEO;
    while under the lock, determining, by the processing
      unit, whether the HEO is currently owned by a
      thread;
    based on a determination that the HEO is currently
      owned by a thread,
      adding, by the processing unit, the first work unit to
        the HEO queue; and
      releasing, by the processing unit, the lock on the
        HEO; or
    based on a determination that the HEO is not currently
      owned by a thread,
      assigning, by the processing unit, ownership of the
        HEO to a thread; and
      releasing, by the processing unit, the lock on the
        HEO.

12. The method of claim 11, further comprising:
  based on a determination that the HEO is not currently
    owned by a thread,
    selecting a thread to perform the first work unit;
    assigning ownership of the HEO to the selected thread;
    adding the first work unit to a public queue of the
      selected thread; and
    unlocking the HEO.

13. The method of claim 11, further comprising:
  based on a determination that the HEO is currently owned
    by a thread,
    determining whether a first thread owns the HEO,
      wherein the first thread is initially intended to pro-
      cess the first work unit;
    based on a determination that the first thread owns the
      HEO,
      adding the first work unit to a private queue of the
        first thread; or based on a determination that the first thread does not
      own the HEO,
      adding the first work unit and an identifier of the first
        thread to the HEO queue.

14. The method of claim 11, further comprising:
  based on a determination that the HEO is currently owned
    by a thread,
    adding an identifier of a first thread that is to perform
      the first work unit to the HEO queue;
    completing, by the thread that currently owns the HEO,
      performance of another work unit that is under
      protection of the HEO;
    releasing, by the thread that currently owns the HEO,
      ownership of the HEO; and
    assigning, by the thread that currently owns the HEO,
      ownership of the HEO to the first thread.

15. The method of claim 14, further comprising:
  processing, by the first thread, another work unit while the
    first work unit is in the HEO queue.

16. The method of claim 11, further comprising:
  assigning ownership of the HEO to a first thread follow-
    ing the first work unit reaching a top of the HEO queue;
  moving the first work unit from a public queue to a private
    queue of the first thread;
  removing the first work unit from the private queue of the
    first thread;
  processing the first work unit; and
  placing a lock on the HEO.

17. The method of claim 16, further comprising:
  while the lock is on the HEO,
    determining whether the HEO queue is empty;
    based on a determination that the HEO queue is empty,
      releasing ownership of the HEO; or
    based on a determination that the HEO queue is not
      empty, moving another work unit in the HEO queue
      to the private queue of the first thread; and
  unlocking the HEO.

18. A non-transitory computer-readable medium on which
is stored a plurality of instructions that when executed by a
processing unit of a processor, cause the processing unit to:
  determine whether a first thread is to process a first work
    unit that is to be scheduled under protection of a hybrid
    exclusion object (HEO), the HEO including an HEO
    queue;
  based on a determination that the first work unit is to be
    scheduled under protection of the HEO,
    place a lock on the HEO;
    while under the lock, determine whether the HEO is
      currently owned by a thread;
    based on a determination that the HEO is currently
      owned by a thread,
      determine whether the HEO is currently owned by
        the first thread;
      based on a determination that the HEO is currently
        owned by the first thread, add the first work unit
        to a private queue of the first thread; or
      based on a determination that the HEO is not cur-
        rently owned by the first thread, add the first work
        unit to the HEO queue; and
    unlock the HEO.

19. The non-transitory computer-readable medium of
claim 18, wherein the instructions further cause the process-
ing unit to:
  based on a determination that the HEO is not currently
    owned by a thread,
    determine whether the first thread is to process the first
      work unit;

based on a determination that the first thread is to process the first work unit, assign ownership of the HEO to the first thread; and add the first work unit to a private queue of the first thread; or based on a determination that the first thread is not to process the first work unit, select another thread to process the first work unit;

assign the HEO to the selected another thread; and add the first work unit to a public queue of the selected another thread; and unlock the HEO.

20. The non-transitory computer-readable medium of claim 18, wherein the instructions further cause the processing unit to:

based on a determination that the HEO is currently owned by a thread, add an identifier of the first thread to the HEO queue;

complete, by the thread that currently owns the HEO, processing of another work unit that is under protection of the HEO;

release, by the thread that currently owns the HEO, ownership of the HEO; and assign, by the thread that currently owns the HEO, ownership of the HEO to the first thread.

* * * * *